(12) United States Patent
Newton

(10) Patent No.: US 10,642,062 B2
(45) Date of Patent: May 5, 2020

(54) CONTENT REDIRECTION IN A MULTI-LAYERED DISPLAY SYSTEM

(71) Applicant: PURE DEPTH INC., Auckland (NZ)

(72) Inventor: John D. Newton, Auckland (NZ)

(73) Assignee: Pure Depth, Inc. (NZ)

( * ) Notice: Subject to any disclaimer, the term of this patent is extended or adjusted under 35 U.S.C. 154(b) by 0 days.

(21) Appl. No.: 15/915,572

(22) Filed: Mar. 8, 2018

(65) Prior Publication Data

US 2018/0259782 A1    Sep. 13, 2018

Related U.S. Application Data

(60) Provisional application No. 62/469,486, filed on Mar. 9, 2017.

(51) Int. Cl.
*G02F 1/1347* (2006.01)
*G02B 30/52* (2020.01)
*G02F 1/1335* (2006.01)
*G09G 3/00* (2006.01)

(52) U.S. Cl.
CPC ........... *G02B 30/52* (2020.01); *G02F 1/1347* (2013.01); *G02F 1/133528* (2013.01); *G09G 3/003* (2013.01); *G02F 2201/508* (2013.01); *G09G 2300/023* (2013.01); *G09G 2330/08* (2013.01); *G09G 2330/12* (2013.01); *G09G 2380/10* (2013.01)

(58) Field of Classification Search
CPC ............... G02B 27/2278; G02B 30/52; G02F 1/133528; G02F 1/1347; G02F 2201/508; G09G 2300/023; G09G 2330/08; G09G 2330/12; G09G 2380/10; G09G 3/003; G09G 3/3208; B60K 35/00; B60K 37/02; G06F 3/1423
See application file for complete search history.

(56) References Cited

U.S. PATENT DOCUMENTS

| | | | |
|---|---|---|---|
| 4,568,928 A | 2/1986 | Biferno | |
| 2007/0091011 A1 | 4/2007 | Selbrede | |
| 2008/0122865 A1* | 5/2008 | Vanmoor | G09G 3/003 345/619 |
| 2008/0136741 A1 | 6/2008 | Williams et al. | |
| 2008/0258892 A1* | 10/2008 | Itoh | B60K 37/02 340/441 |
| 2009/0079667 A1 | 3/2009 | Schlottmann et al. | |
| 2009/0135090 A1* | 5/2009 | Kim | G09G 3/003 345/6 |
| 2011/0175902 A1 | 7/2011 | Mahowald | |
| 2012/0007795 A1* | 1/2012 | Selbrede | G02F 1/1347 345/6 |
| 2012/0020556 A1 | 1/2012 | Manabe | |

(Continued)

*Primary Examiner* — Richard J Hong
(74) *Attorney, Agent, or Firm* — Craig A. Baldwin

(57) ABSTRACT

A multi-layered display (MLD) system having improved reliability for vehicular and other applications, is described. In one example, the MLD system detects a fault associated with a first display screen of the MLD, selects one of the display screens other than the first display screen as a backup display screen, combines an image generated for displaying on the first display screen and an image generated for displaying on the selected backup display screen to form a combined image, and displays the combined image on the selected backup display screen.

19 Claims, 4 Drawing Sheets

(56) References Cited

U.S. PATENT DOCUMENTS

| | | | |
|---|---|---|---|
| 2012/0223964 A1* | 9/2012 | Oishi | B60K 35/00 |
| | | | 345/629 |
| 2013/0077228 A1 | 3/2013 | Batio | |
| 2014/0184669 A1* | 7/2014 | Oh | G09G 3/3208 |
| | | | 345/694 |
| 2014/0253494 A1 | 9/2014 | Jiang et al. | |
| 2017/0355467 A1* | 12/2017 | Rudolph | G06F 3/1423 |

* cited by examiner

CONTENT REDIRECTION IN A MULTI-LAYERED DISPLAY SYSTEM

CROSS REFERENCE TO RELATED APPLICATIONS

This application claims the benefit of priority to U.S. Provisional Patent Application No. 62/469,486 filed on Mar. 9, 2017, the entire contents of which is hereby incorporated by reference.

BACKGROUND

This disclosure relates generally to displays and, more particularly, to display systems and methods for displaying images on multi-layered displays.

Image displays limited to a single two dimensional display lack depth information. To relay depth information of objects, there have been efforts to provide displays that can display the objects in three-dimensions. Stereo displays, for example, convey depth information by displaying offset images that are displayed separately to the left and right eye. However, stereo displays are limited from what angle an observer may view the display, and may cause discomfort to the viewer.

Multi-layered displays have also been developed to display objects with a realistic perception of depth. Multi-layered display (MLD) systems are becoming popular for several applications such as for vehicle dashboards, handheld devices and the like. Multi-layered display systems can be configured to display images of scenes so that depth can be represented by distributing objects to be displayed on to the separate display panels of the multi-layered display. Example multi-layered display systems are described in U.S. patent application Ser. No. 15/359,732 filed on Nov. 23, 2016, the contents of which is incorporated herein in its entirety.

The use of multi-layered display systems in applications such as vehicular dashboards, where failure of the display could result in substantial danger, damage and/or costs, requires the multi-layered display systems to have a very high level of reliability. Even in applications such as personal device displays, it is still desired nowadays that the displays have a high level of reliability. Therefore, it is desired to have techniques for improving the reliability of multi-layered display systems.

SUMMARY

Exemplary embodiments provide a display system that can provide visual depth information using a multi-layered display including two or more display screens (e.g., LCDs) and/or layers provided in a stacked arrangement with improved reliability. Visual depth information of displayed objects may be provided by displaying corresponding gradients on multiple display screens. Improved reliability may be provided by automatically rerouting image content that was to be displayed on a faulty one of the screens to an operational one of the screens of the same multi-layered display system.

In an example embodiment, a multi-layered display system for displaying three-dimensional images is provided. The system comprises a plurality of display screens including at least a first display screen and a second display screen arranged in a substantially parallel and overlapping manner, and a processing system comprising at least one processor and memory. The processing system configured to detect a fault associated with the first display screen, select one of the display screens other than the first display screen as a backup display screen, combine a first image generated for displaying on the first display screen and a second image generated for displaying on the selected backup display screen to form a combined image, and display the combined image on the selected backup display screen.

In another example embodiment, a method is provided for displaying three-dimensional images in a multi-layered display system comprising a plurality of display screens including at least a first display screen and a second display screen arranged in a substantially parallel and overlapping manner. The method detects a fault associated with the first display screen, selects one of the display screens other than the first display screen as a backup display screen, combines a first image generated for displaying on the first display screen and a second image generated for displaying on the selected backup display screen to form a combined image, and display the combined image on the selected backup display screen.

In another exemplary embodiment, there may be provided a non-transitory computer-readable storage medium having stored therein a program for execution a processing system of a display system. The program, when executed, may cause the processing system to control a first display screen to display a first image including a first gradient area, control a second display screen, arranged in an overlapping manner with the first display screen, to display a second image including a second gradient area, and control a third display screen, arranged in an overlapping manner between the first display screen and the second display screen, to display a third image. The third image may include a third gradient area overlapping at least a portion of the first gradient area displayed on the first display screen and at least a portion of the second gradient area displayed on the second display screen.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Multi-layered display systems include multiple separate display screens (also referred to as display layers or display panels). As described in the above incorporated patent application, a composite image of a scene is viewed by an observer on a multi-layered display system. The composite image is the visual appearance to the observer of separate images of various portions of the scene displayed on respective display screens of the multi-layered display system. Multi-layered displays provide a depth effect to the observer by careful content creation across two or more stacked display screens. These displays are currently useful in the dashboard centre stack and/or instrument cluster of a vehicle where they can provide realistic or near-realistic 3D representations of dials, gauges, sliders, menus, switches etc.

Example embodiments of the present disclosure leverage the multiple stacked display screens of the multi-layered display system to improve the reliability and/or the accuracy of the displayed image. Any of these multiple display screens may at some point malfunction due to wear, accident, thermal stress or other issues. Should any of these display screens malfunction and stop working, it would be useful to have a backup. According to some example embodiments, when an image of a scene is to be displayed on a multi-layered display by transmitting respective images having portions of the scene to the separate display screens of the multi-layered display system, upon detecting (e.g., based on a fault signal) a malfunction in one display panel and as a result being unable to display the respective image destined to that malfunctioning displays screen, rather than merely displaying only the images destined for the non-malfunctioning display screens, the multi-layered display system automatically adjusts in order to present a composite image with improved reliability and accuracy to the observer. The multi-layered display system, according to example embodiments, adjusts to the malfunctioning of a display screen by redirecting (rerouting) the image originally generated for displaying on the malfunctioning display screen to a selected other display screen and displaying, on the selected display screen, a combined image formed from the image that was originally generated for displaying on the selected display screen and at least portions of the image originally generated for the malfunctioning display screen. In this manner, the observer is provided with continuing visibility to a scene that was to be displayed on a faulty one of the display screens.

Figure 1:
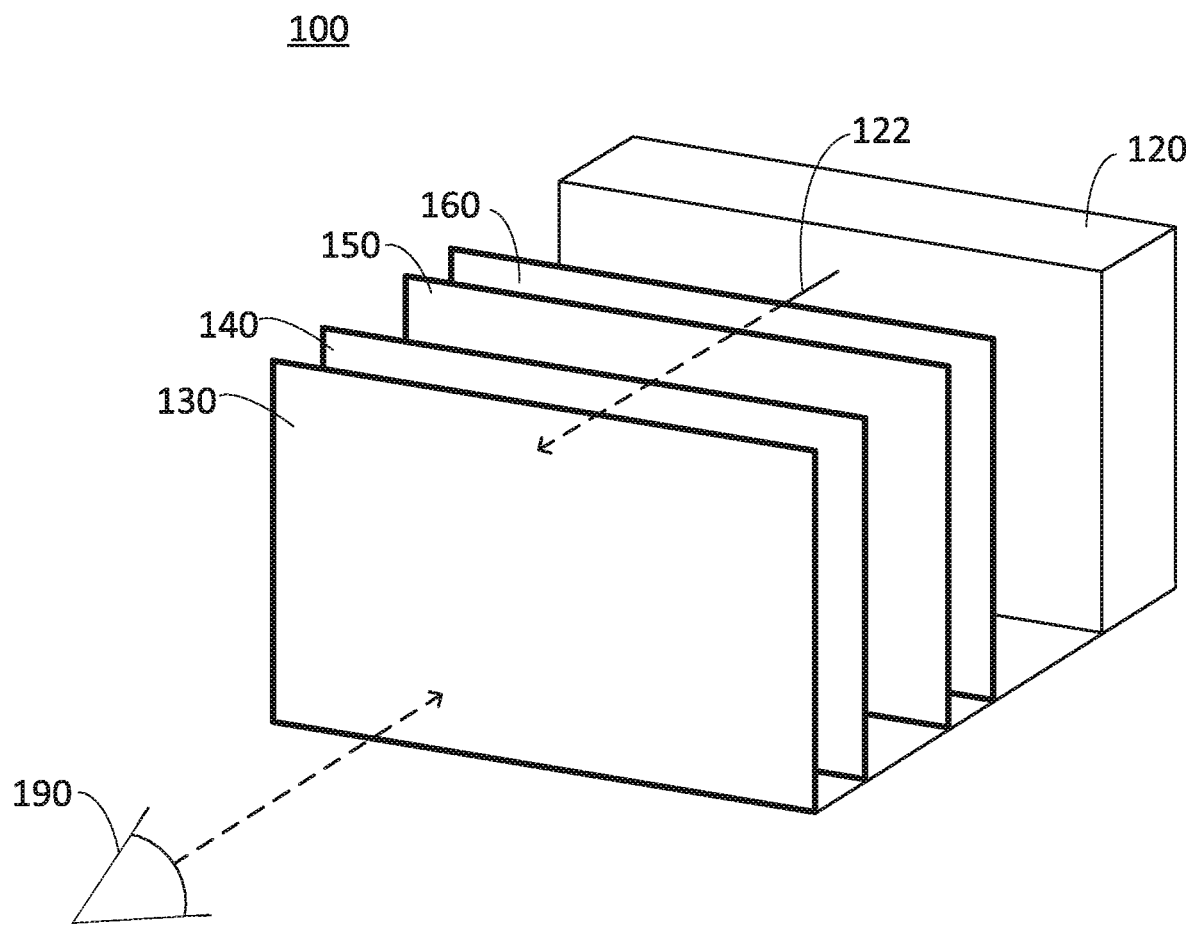
FIG. 1 schematically illustrates a display system according to some example embodiments of the present disclosure.

FIG. 1 illustrates a multi-layered display system 100 according to some example embodiments of the present disclosure. The display system 100 may include a light source 120 (e.g., rear mounted light source, side mounted light source, optionally with a light guide), and a plurality of display screens 130-160. The display screens 130-160 may be disposed substantially parallel or parallel to each other and/or a surface (e.g., light guide) of the light source 120 in an overlapping manner. In one embodiment, the light source 120 and the display screens 130-160 may be disposed in a common housing. It will be understood that, in some example embodiments, multi-layered display 100 may include only two display screens, and may or may not include a light source 120 (e.g., a light source may be external to the housing of the multi-layered display system). The multi-layered display 100 may be provided at the dash of a vehicle in some example embodiments of this disclosure, in order to show the viewer (observer) images such as a speedometer, gauges such as oil pressure or fuel level gauges, navigation, etc. It should be appreciated that the elements illustrated in the figures are not drawn to scale, and thus, may comprise different shapes, sizes, etc. in other embodiments. It should also be appreciated that vehicular dashboard are only one application for multi-layered display systems, and that the use of multi-layered display systems as displays for portable devices, advertising displays, etc. are contemplated in various embodiments.

In an example application of displaying a three dimensional 3D effect using an multi-layered display system, the multi-layered display system 100 may display graphical information to a viewer/observer 190, such as an operator or passenger of a vehicle, by displaying information including a gradient on two, three, or more of the display screens 130-160 simultaneously. To mimic depth cues of the displayed object, portions of the same object can be displayed with different gradients of a given color or the like on different display screens 130-160. For example, each of the display screen 130-160 may be controlled to display a different portion of a gauge and/or needle found in a traditional vehicle instrument panel. In certain embodiments, each of the display screen 130-160 may be controlled to display a different portion of an image (e.g., clock, gauge and/or needle(s)) of a watch device to be worn in the wrist of a user, or the like.

In one example application of display system 100, gradients can be used to better show sloped/inclined surfaces to a viewer in a three dimensional manner using display system 100. An example gradient would fade from a dark color (e.g., dark grey) at the front of the display apparatus to a light color (e.g., light grey) at or near the rear of the display apparatus, in order to better show a three dimensional image of a movable needle (e.g., speedometer needle, oil pressure needle, RPM needle, clock needle, temperature needle, fuel level needle, etc.) to an operator of the vehicle, or vice versa. For instance, a main body of a needle may be a darkest color (e.g., black or dark grey) as shown by the display panel 130 closest to the viewer, and sides or edges of the needle may get progressively lighter shades of that color (e.g., lighter grey or white) in display panels 140, 150 moving further rearward away from the viewer, such that the lightest version of that color (lightest grey) would be emitted from the rear-most display panel 160 for very edges/sides of the needle. The opposite gradient may also be provided, in particular a main body of a needle may be a light color (e.g., white or light grey) as shown by the display panel 130 closest to the viewer, and sides or edges of the needle on the inclined surface may get progressively darker (e.g., to dark grey or black) in display panels 140, 150 moving further rearward away from the viewer, such that the lightest level would be emitted from the forward-most display panel 160 for that object having an inclined surface. The gradients above refer, for example, to dark and light colors forming gradients, where for example the darkest color may be at the center of an object displayed by a first panel and a lightest or lighter color may be provided at an outer part of the object for another panel (or vice versa). The darker color is generally desired to be opaque or substantially opaque, while the lighter color may or may not be transparent or substantially transparent from the point of view of the viewer.

The light source 120 may be configured to provide illumination for the display system 100. The light source 120 may provide substantially collimated light 122 that is transmitted through the display screens 130-160. Optionally, the light source 120 may provide highly collimated light using high brightness LED's that provide for a near point source. The LED point sources may include pre-collimating optics providing a sharply defined and/or evenly illuminated reflection from their emission areas. The light source 120 may include reflective collimated surfaces such as parabolic mirrors and/or parabolic concentrators. In one embodiment, the light source 120 may include refractive surfaces such as convex lenses in front of the point source. However, the LEDs may be edge mounted and direct light through a light guide which in turn directs the light toward the display panels in certain example embodiments.

The problem of having a display backup in a case where a primary display malfunctions (e.g., damaged or worn) is solved by stacking displays in normally black, according to some example embodiments. Although the display screen in normally black is primarily for visual effect, having stacked display screens in normally black mode provides for redundancy should one display screen fail, in this case, some or all of the content can be rerouted from a non-working display screen to one or more functioning display screens. In some example embodiments, the display screens are stacked LCD layers within a single pair of cross polarizers on the external facing surfaces if the panels are LCD or just stacked with transparent LED or OLED technologies. The rear most display layer may be a non-transparent technology. The LCD layers may be twisted nematic film in vertically aligned, patterned vertical alignment, or in plane switching modes, transparent OLED (TOLED), and/or transparent direct view micro LED displays. In certain example embodiments, the LCD displays are used in normally black mode, which is they have no effect on incident polarized light should the pixel not have voltage applied across it. In some embodiments, TOLED or micro LED displays may be used in the off state, which is not emitting light. In one example embodiment, the display panels 130-160 may be combinations of either full color RGB, RGBW or monochrome panels. The display screens 130-160 are not limited to the listed display technologies and may include other display technologies that allows for the projection of light. In one embodiment, the light may be provided by a projection type system including a light source and one or more lenses and/or a transmissive or reflective LCD matrix.

In one embodiment, each of the display screens 130-160 may be approximately the same size and have a planar surface that is parallel or substantially parallel to one another. In another embodiment, one or more of the display screens 130-160 may have a curved surface. In one embodiment, one or more of the display screens 130-160 may be displaced from the other display screens such that a portion of the display screen is not overlapped and/or is not overlapping another display screen.

Each of the display screens 130-160 may be displaced an equal distance from each other in example embodiments. In another embodiment, the display screens 130-160 may be provided at different distances from each other. For example, a second display screen 140 may be displaced from the first display screen 130 a first distance, and a third display screen 150 may be displaced from the second display screen 140 a second distance that is greater than the first distance. The fourth display screen 160 may be displaced from the third display screen 150 a third distance that is equal to the first distance, equal to the second distance, or different from the first and second distances.

The display screens 130-160 may be configured to display graphical information for viewing by the observer 190. The viewer/observer 190 may be, for example, a human operator or passenger of a vehicle, or an electrical and/or mechanical optical reception device (e.g., a still image, a moving-image camera, etc.). Graphical information may include visual display of objects and/or texts. In one embodiment, the graphical information may include displaying images or a sequence of images to provide video or animations. In one embodiment, displaying the graphical information may include moving objects and/or text across the screen or changing or providing animations to the objects and/or text. The animations may include changing the color, shape and/or size of the objects or text. In one embodiment, displayed objects and/or text may be moved between the display screens 130-160. The distances between the display screens 130-160 may be set to obtain a desired depth perception between features displayed on the display screens 130-160.

In one embodiment, a position of one or more of the display screens 130-160 may be adjustable by an observer 190 in response to an input. Thus, an observer 190 may be able to adjust the three dimension depth of the displayed objects due to the displacement of the display screens 130-160. A processing system may be configured to adjust the displayed graphics and gradients associated with the graphics in accordance with the adjustment.

Each of the display screens 130-160 may be configured to receive data and display, based on the data, a different image on each of the display screens 130-160 simultaneously. Because the images are separated by a physical separation due to the separation of the display screens 130-160, each image may be provided at a different focal plane and depth is perceived by the observer 190 in the displayed images. The images may include graphics in different portions of the respective display screen.

While not illustrated in FIG. 1, the display system 100 may include one or more projection screens, one or more diffraction elements, and/or one or more filters between an observer 190 and the projection screen 160, between any two projection screens 130-160, and/or the projection screen 130 and the light source 120.

Figure 2A:
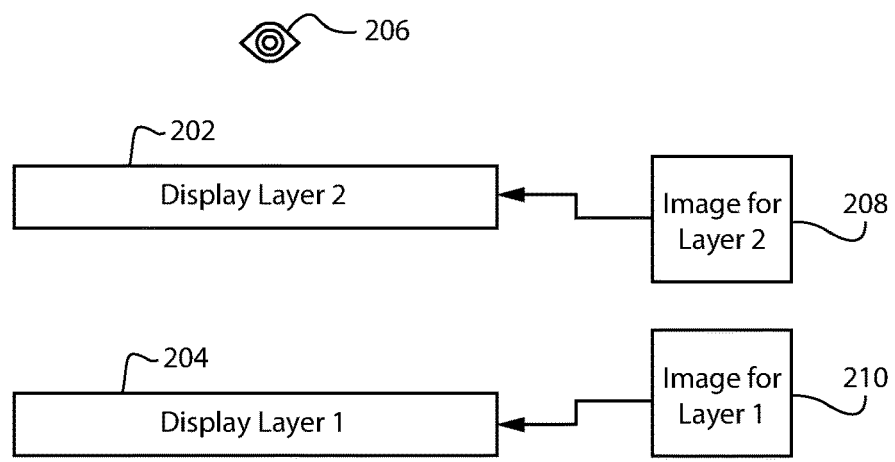
FIGS. 2A, 2B and 2C schematically illustrate image distribution to display panels in a display system according to some example embodiments of the present disclosure.
Figure 2B:
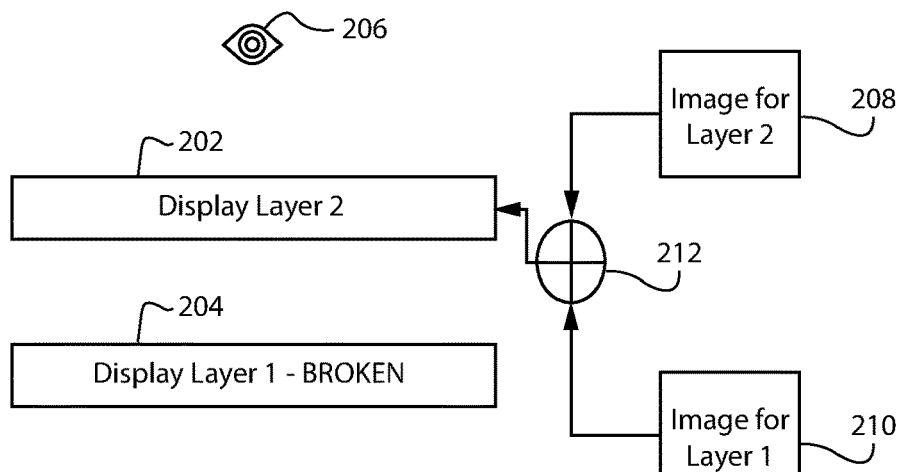
Figure 2C:
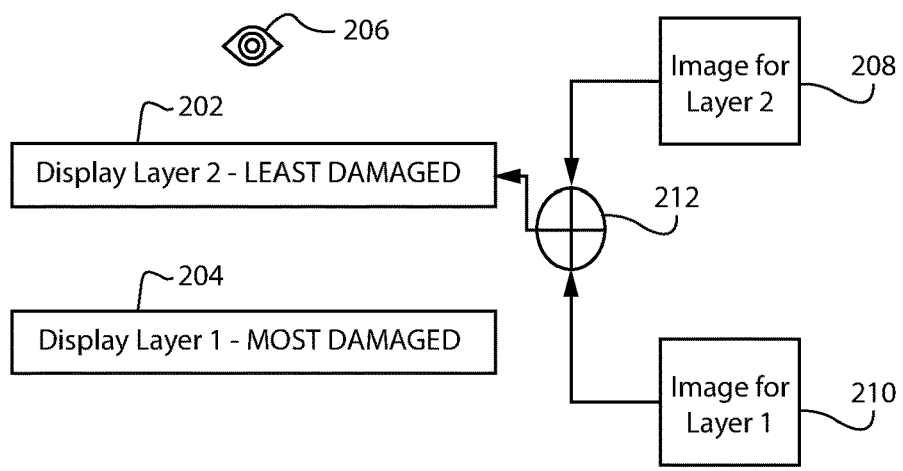

FIG. 2 (FIGS. 2A, 2B and 2C) shows schematic views of how respective images may be displayed on separate display screens of an example multi-layered display system according to some example embodiments. Display screens 202 and 204 shown in each of FIGS. 2A, 2B and 2C represent two display panels of a multi-layered display system such as display system 100. As noted above, display system 100 and the multi-layered display system that includes the respective display screens 202 and 204 may have two or more display screens. Persons skilled in the art will appreciate that a multi-layered display system which includes display screens 202 and 204 may, although not separately shown in FIG. 2, include a light source (such as, for example, light source 120) to illuminate the multi-layered display system and a processing system including associated circuitry to process images and to control the display of images on the multi-layered display system. According to some example embodiments, display screens 202 and 204 are respective display panels in multi-layered display system 100. For example, display screens 202 and 204 may be the top most display screen 130 and the next display screen 140 of multi-layered display system 100, with observer 206 being closest to display panel 202.

FIG. 2A illustrates a scenario when both display screens 202 and 204 are operational. In this scenario, the processing system associated with the display screens 202 and 204 (e.g., a processing system which controls at least portions of the multi-layered display system which includes display screens 202 and 204) has not detected a fault indicating a display screen malfunction for either of display screen 202 or display screen 204. Respective images 208 and 210 generated for displaying respectively on display screens 202 and 204 are rerouted by the processing circuitry to display screens 208 and 210. That is, when no fault in any of the display screens of a multi-layered display system has been detected by the processing system, respective images generated for display on each display screen are transmitted to the display screen for which the respective image was generated. This (the mode of operation shown in FIG. 2A) is the normal mode of operation for the multi-layered display system.

FIG. 2B illustrates a scenario where the processing system has detected a fault indicating that display screen 204 is malfunctioning (e.g., broken or non-operational). In this scenario, the processing system combines the respective images 208 and 210 generated for the intended display on display screens 202 and 204, into a single combined image that is then displayed on display screen 202 which did not indicate a fault. Types of faults associated with display screens, fault detection and the combining of images are further described below in relation to FIG. 3.

FIG. 2C illustrates another scenario in which the processing system has detected a fault and both display screens 202 and 204 are damaged. In this scenario, the processing system may detect faults from one or both the display screen 202 and display screen 204. The processing system detects that while both display screens are damaged, display screen 202 is less damaged than display screen 204. Based upon this determination of the least damaged of the display screens, the processing systems transmits a combined image, formed by combining the image 202 originally generated for display screen 202 and image 204 originally generated for display screen 204, to the least damaged display screen 202. Types of faults associated with display screens, fault detection and the combining of images are further described below in relation to FIG. 3.

Although, the multi-layered display system operating scenarios described in relation to FIG. 2 relates primarily to two display screens in a multi-layered display system, persons of skill in the art will appreciate that the techniques are applicable to multi-layered display systems having any number of display screens. The display backup techniques shown in FIG. 2 may be applicable to subsets two or more display screens (each subset being configured as a "display backup group") in a multi-layered display system. For example, each pair of adjacent display screens in a multi-layered display system may be configured as a display backup group in which in each pair, one screen is capable of acting as a backup (e.g., displaying a combined image as in display screen 202 in FIGS. 2B and 2C) for the other. Of course, embodiments are not limited to having all the display screens as one display backup group, or having display backup groups of adjacent pairs of display screens. Although display backup groups in which the display screen which act as the backup for a faulty display screen is not adjacent to the faulty display screen are possible, increased distance (and/or a higher number of other display screens being between the faulty display screen and the display screen selected as backup display) may show a reduced image quality in the combined images.

Figure 3:
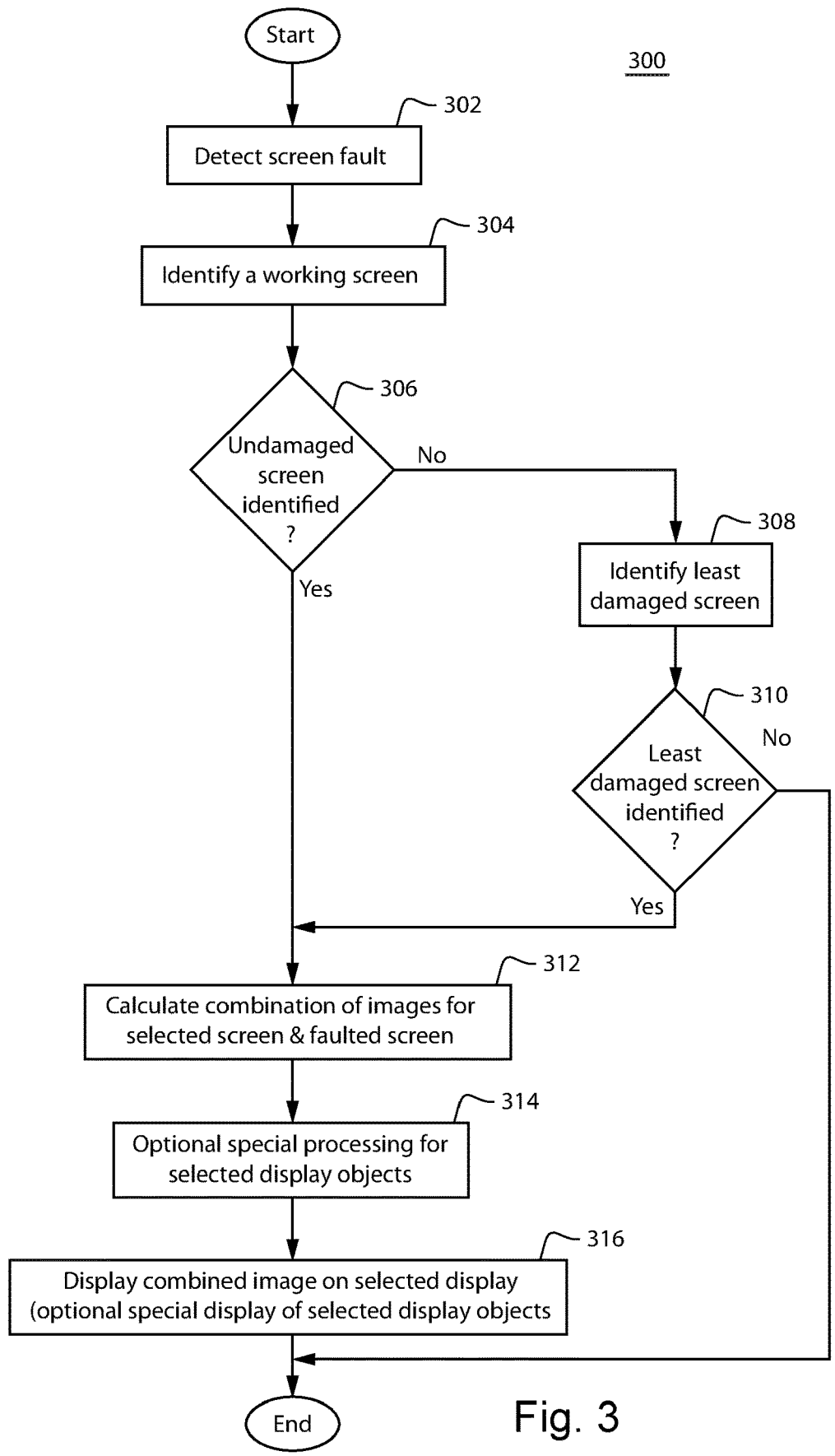
FIG. 3 illustrates a flowchart representing a method for displaying information on a multi-layered display system according to some example embodiments of the present disclosure.

FIG. 3 illustrates a process 300 for displaying information on a multi-layered display system according to some example embodiments of the present disclosure. Process 300 may be performed by a processing system including one or more hardware processors and memory. For example, process 300 may be performed by a processing system of multi-layered display system 100. According to some example embodiments, process 300 includes operations 302-316. Persons of skill in the art will appreciate that, in some example embodiments, the order of operations of process 300 may be different, one or more operations may not be performed, and/or one or more additional operations may be performed.

As described above, when in normal operation, a multi-layered display system operates as shown in FIG. 2A. For example, when a multi-layered display system is commanded to display an image of a particular scene, a processing system associated with the multi-layered display system would, from the received image of the particular scene, generate respective images for two or more of the screens in the multi-layered display system. In some example embodiments, the respective images may themselves be part of the received display data. The received display data (e.g., the image of the particular scene or the respective images for each display screen) may be retrieved from memory coupled to a processing system and/or from another device. The display data may be received over a network which may be wireless.

The respective images generated for simultaneous display on each display screen of the multi-layered display system may be formed, using any of several techniques, from the image of the particular scene. For example, if the received data comprises the image of the particular scene, the processing system may segment the received image to provide different portions of the received image to be displayed on the first and second display screens of the multi-layered display system. The processing system, as described in the above incorporated U.S. patent application Ser. No. 15/359,732, may further generate gradients etc. to be displayed on the first and second display screens to display features with a perception of three-dimensions due to the displacement of the display screens. The first image may include a gradient area and the second image may include a gradient area that corresponds to the first gradient area. The first gradient area and the second gradient area may at least partially overlap. The first gradient area and the second gradient area may include portions of the same object in a scene, that when displayed in the separate screens as planar graphics with different gradients, is perceived by the observer as an object having a depth dimension.

Each of the images for the separate display screens may include a graphic and/or a gradient portion. In one embodiment one or more of the images may include a plurality of graphics and each of the graphics may be a separate from each other. The display data may include a sequence of images (e.g., video) and/or text for display on the one or more display screens. Each of the images may include one or more of objects, text, and/or animations. The display data may be periodically or continuously received with updated information for display.

Process 300 may occur while the multi-layered display system is operating in a normal mode of operation and is displaying, using received display data, a first image on a first display screen, and a second image on a second display screen arranged in an overlapping manner with the first display screen (e.g., such as shown in FIG. 2A). After process 300 is entered, at operation 302 a fault indicating a malfunction of a display screen of the multi-layered display system is detected.

The processing system of the multi-layered display system may be configured to invoke process 300 upon the occurrence of one or more faults associated with the display screens. The detection of the fault may be based on one or more hardware and/or software triggers that are raised when a fault is detected on at least one of the display screens. The faults detected may include, for example, failures such as a dead display screen, one or more pixels being burnt, one or more rows or columns of pixels being un-operational, and the like. The different types of faults and respective handling routines may be defined in a configurable or non-configurable list. These failures may be due to accident (e.g., crack in the screen), other damage or some other malfunction of the system. The processing system may determine the fault based on any of a trigger condition, a register value, or further communication with the display screen for which the fault was raised.

At operation 304, the processing system attempts to identify a still operational (e.g., with no associated fault) display screen of the multi-layered display system. The identification may be based upon checking on the current status of each of the other display screens. According to some embodiments, one or more hardware registers and/or defined memory locations may maintain information regarding a status of each display screen. According to some other embodiments, the current status of the display screen may be determined by polling each of the display screens. A display screen may be considered as failed if there is currently a fault associated with it or it is discovered by the processing system based on a polling or status value stored in hardware or software register.

At operation 306, the processing system determines whether an undamaged (e.g., a fully operational display screen, or display screen having no associated faults) display screen was successfully identified. This determination may be based upon the checking and/or monitoring of the hardware registers and/or memory locations that maintain the status of each display screen, as described in relation to the previous operation. In an example embodiment, an undamaged display screen may be considered as a display screen for which there is currently no fault being raised.

If, at operation 306, an undamaged display screen is detected, process 300 proceeds to operation 312. Operation 312 is described below.

If, at operation 306, the processing system fails to detect an undamaged screen, process 300 proceeds to operation 308. That is, all the display screens of the multi-layered display system are damaged. At operation 308, the processing system attempts to identify a least damaged display screen. This determination may be based upon a prioritized list of the different types of faults and/or statuses that may occur in the display screens. For example, the monitoring/checking of the status of each of the display screens may indicate to the processing system sufficient information to determine with respect to each display screen as to whether the screen is dead, one or more pixels of the screen are un-operational, and/or a size of a malfunctioning region of the screen. In some example embodiments, a display screen with the smallest region of damaged (or non-operational) pixels may be selected as the least damaged display screen. In some embodiments, the display screen statuses indicated by registers and/or polling may indicate a level of failure, which may then be used to determine the least damaged display screen. In yet other example embodiments, the failed area in each display screen may determine the level or severity of its damage.

In a two display screen multi-layered display system, the selection of the least damaged screen may only consider the level of damage. When more than two display screens are in the multi-layered display system, the selection of the least damaged screen may, in addition to the level of damage of each partly damaged display screen, also consider the proximity between a selected display screen and the malfunctioning display screen. Then, for a particular malfunctioning display screen, the selected display screen may be the display screen with a highest combined score determined based upon a combination of the level of damage and proximity to the malfunctioning display screen. The score may be designed to prefer proximity over distance and to prefer less damage over higher damage levels.

At operation 310, it is determined whether a least successfully damaged display screen was identified.

If, at operation 310, no least damaged display screen was successfully identified, then all the display screens of the multi-layered display screen may be damaged beyond a certain level (e.g., all screens dead, all screens have at least 50% of pixels non-operational, etc.) of damage. Then, process 300 terminates.

If, at operation 310, a least damaged display screen is successfully identified, then process 300 proceeds to operation 312.

At operation 312, the image originally generated to be displayed on the damaged display screen is combined with the image originally generated to be displayed on the selected backup display screen. The selected backup display screen may be the undamaged screen selected at operation 306 or the least damaged screen selected at operation 308. The combination may be performed, according to some example embodiments, by calculating the arithmetic sum of the first and second images. Other combination techniques (e.g., weighted combination, subtraction or multiplication operations, geometric combinations etc.) for combining two images may be used in some embodiments.

At operation 314, optional processing may be performed for selected display objects. According to some example embodiments, the processing system may identify certain prioritized objects that were included in the image that was to be displayed on the damaged display screen and determine that special processing in addition to, and/or in place of, the processing for the image that was to be displayed on the damaged display screen is to be performed with respect to at least some of these identified prioritized objects. Prioritized objects may be identified by the processing system based upon a configured list in memory and/or based on the type of object. A configured list of prioritized objects may be application-specific. For example, in the case of a multi-layered display system used as a vehicular dashboard display, the prioritized objects list may include one or more objects displaying alerts regarding failure of critical vehicle components, objects displaying speed, warning lights, transmission indicators, etc.

The special processing may include differently displaying one or more of the prioritized objects that were found to be included in the image originally generated for display on the damaged screen. For example, the special processing may cause a speedometer object that was in the image originally generated for display on the damaged screen being rerouted to be displayed in a different manner and/or different display screen than the rest of that image: the speedometer object may be displayed on another (working) area of the same damaged display, or on a working display different from the display screen selected for displaying the combined image including the image for the damaged display screen.

At operation 316, a combined image is displayed on the selected display screen. The combined image may be the image formed at operation 312 by combining the image originally generated for display on the selected display screen and the image originally generated for display on the damaged screen. In some example embodiments, the displayed combined image may further include an image, and/or modification of the combined image in accordance with the optional special processing at operation 314.

After operation 316, process 300 terminates.

Process 300 enables a multi-layered display to have improved reliability and to be more consistent and more accurate in its presentation of information even during certain failures of components.

Modification of the displayed images may be made in response to instructions received from an observer or instructions from a processing system. The instructions may include reducing or increasing the depth of displayed objects. The depth of displayed objects may be increased by using additional display screens to display the objects. For example, to increase the perceived depth, a portion of an object displayed on one display screen may be moved to an overlapped display screen that is further away from the observer and a gradient may be displayed in place of the object. In another embodiment, a portion of an object displayed on one display screen may be moved to an overlapping display screen that is closer to the observer and a gradient may be displayed in place of the object.

Process 300 enables a multi-layered display system to maintain full viewability (e.g., full view of the instrument cluster/centre console data in the case of a vehicle dashboard) in scenarios where at least one display screen in the multi-layered display system is undamaged. For example, in a two display screen multi-layered display system, when only one of the display screens are damaged process 300 may operate to maintain full view ability of the displayed screen. In scenarios where all the display screens are damaged but at least one display screen is only partially damaged, process 300 enables maintaining a maximal viewability of the displayed scene.

Figure 4:
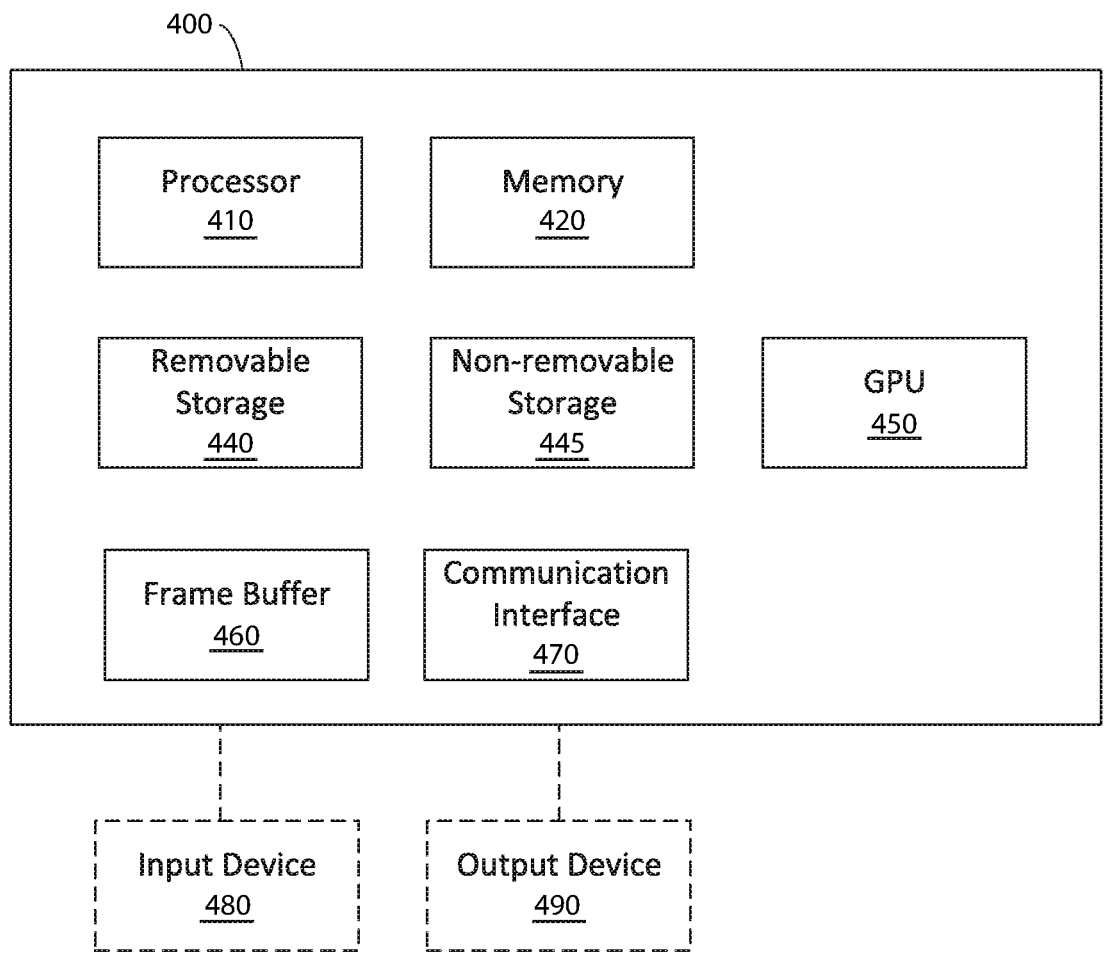
FIG. 4 illustrates an exemplary processing system upon which embodiments of the present disclosure(s) may be implemented, such as FIGS. 1-3.

FIG. 4 illustrates an exemplary processing system 400 upon which embodiments of the present disclosure(s) may be implemented. The processing system 400 may include one or more processors 410 and memory 420. The processor 410 may comprise a central processing unit (CPU) or other type of processor. Depending on the configuration and/or type of computer system environment, the memory 720 may comprise volatile memory (e.g., RAM), non-volatile memory (e.g., ROM, flash memory, etc.), or some combination of the two. Additionally, memory 420 may be removable, non-removable, etc.

In other embodiments, the processing system may comprise additional storage (e.g., removable storage 440, non-removable storage 445, etc.). Removable storage 440 and/or non-removable storage 445 may comprise volatile memory, non-volatile memory, or any combination thereof. Additionally, removable storage 440 and/or non-removable storage 445 may comprise CD-ROM, digital versatile disks (DVD) or other optical storage, magnetic cassettes, magnetic tape, magnetic disk storage or other magnetic storage devices, or any other medium which can be used to store information for access by processing system 400.

As illustrated in FIG. 4, the processing system 400 may communicate with other systems, components, or devices via communication interface 470. Communication interface 470 may embody computer readable instructions, data structures, program modules or other data in a modulated data signal (e.g., a carrier wave) or other transport mechanism. By way of example, communication interface 470 may be couple to wired media (e.g., a wired network, direct-wired connection, etc.) and/or wireless media (e.g., a wireless network, a wireless connection utilizing acoustic, RF, infrared, or other wireless signaling, etc.).

Communication interface 470 may also couple the processing system 400 to one or more input devices 480 (e.g., a keyboard, mouse, pen, voice input device, touch input device, etc.) and/or output devices 490 (e.g., a display, speaker, printer, etc.). The input devices 490 may be used by an observer to manipulate the way information is displayed on an output device 490 and/or what information and/or graphics are displayed in different portion of the output device 490. In one embodiment, communication interface 470 may couple the processing system 400 to a display including two or more display panels arranged in an overlapping manner.

As shown in FIG. 4, a graphics processor 450 may perform graphics/image processing operations on data stored in a frame buffer 460 or another memory of the processing system. Data stored in frame buffer 460 may be accessed, processed, and/or modified by components (e.g., graphics processor 450, processor 410, etc.) of the processing system 400 and/or components of other systems/devices. Additionally, the data may be accessed (e.g., by graphics processor 450) and displayed on an output device coupled to the processing system 400. Accordingly, memory 420, removable storage 440, non-removable storage 445, frame buffer 460, or a combination thereof, may comprise instructions that when executed on a processor (e.g., 410, 450, etc.) implement a method of processing data (e.g., stored in frame buffer 460) for improved reliability and/or display quality on a display such as, for example, process 300 described above.

As shown in FIG. 4, portions of the present invention may be comprised of computer-readable and computer-executable instructions that reside, for example, in a processing system 400 and which may be used as a part of a general purpose computer network (not shown). It is appreciated that processing system 400 is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

In example embodiment of this invention, a multi-layered display (MLD) system for displaying three-dimensional images is provided. The MLD system includes a plurality of display screens including at least a first display screen and a second display screen arranged in a substantially parallel and overlapping manner; and a processing system comprising at least one processor and memory. The processing system of the MLD is configured to: detect a fault associated with the first display screen; select one of the display screens other than the first display screen as a backup display screen; combine a first image generated for displaying on the first display screen and a second image generated for displaying on the selected backup display screen to form a combined image; and display the combined image on the selected backup display screen.

In the MLD system of the above paragraph, the selecting one of the display screens may include: detecting an undamaged display screen from among the plurality of display screens; if the detecting successfully detects an undamaged display screen, assign the detected undamaged screen as the selected backup display screen; and if the detecting fails to detect an undamaged display screen, determine a least damaged display screen among the plurality of display screens, and assign the determined least damaged display screen as the selected backup display screen.

In the MLD systems of the above two paragraphs, the combining may include calculating the combined image based upon an arithmetic sum of the first image and the second image.

In the MLD system of the above three paragraphs, the processing system may be further configured to: identify one or more prioritized objects in the first image; and displaying the identified one or more prioritized objects in a manner different from the displaying of the combined image.

In the MLD system of the above four paragraphs, the displaying the identified one or more prioritized objects may include: determining whether at least a portion of the first display screen is operational; generating a third image comprising the identified one or more prioritized objects; and if the determining determines that a portion of the first display is operational, displaying the third image on the first display screen.

In the MLD system of the above paragraph, the third image may be rerouted to a working portion, which is different from a portion of the first display screen in which the prioritized objects were originally displayed, of the first display screen.

In the MLD system of the above six paragraphs displays a vehicle dashboard display, and wherein the one or more prioritized objects include a warning light and/or transmission indicator.

In the MLD system of the above seven paragraphs, the processing system is further configured to set the first display screen at least partially off.

In the MLD system of the above eight paragraphs, at least one of display screen of the plurality of display screens is a liquid crystal display.

In the MLD system of the above nine paragraphs, the plurality of display screens is stacked in normally black mode.

In the MLD system of the above ten paragraphs, a rear-most display screen of the plurality of display screens is a non-transparent display screen.

In the MLD system of the above eleven paragraphs, the plurality of display screens comprises a stack of liquid crystal display (LCD) layers within a single pair of cross-polarizers on external facing surfaces.

In the MLD system of the above twelve paragraphs, the plurality of display screens comprises a stack of transparent light emitting diode (TLED) or organic light emitting diode (OLED) layers.

In the MLD system of the above thirteen paragraphs, the plurality of display screens comprises at least one non-transparent display screen.

In the MLD system of the above fourteen paragraphs, the fault is due to a crack in the first display screen, one or more non-functioning rows or columns in the first display screen, a region of dead pixels in the first display screen, and/or dead first display screen.

In some example embodiments of the invention, a method is provided for displaying three-dimensional images in a MLD system comprising a plurality of display screens including at least a first display screen and a second display screen arranged in a substantially parallel and overlapping manner. The method comprises: detecting, using a processing system comprising at least one processor and memory, a fault associated with the first display screen; selecting one of the display screens other than the first display screen as a backup display screen; combining a first image generated for displaying on the first display screen and a second image generated for displaying on the selected backup display screen to form a combined image; and displaying the combined image on the selected backup display screen.

In the method, of the above paragraph, for displaying three-dimensional images in a MLD system, selecting one of the display screens includes: detecting an undamaged display screen from among the plurality of display screens; if the detecting successfully detects an undamaged display screen, assign the detected undamaged screen as the selected backup display screen; and if the detecting fails to detect an undamaged display screen, determine a least damaged display screen among the plurality of display screens, and assign the determined least damaged display screen as the selected backup display screen.

In the method, of the above two paragraphs, the combining includes calculating the combined image based upon an arithmetic sum of the first image and the second image.

An example embodiment of the present invention is a non-transitory computer readable storage medium storing instructions which, when executed by a processor of a MLD system having a plurality of display screens including at least first and second display screens arranged in a substantially parallel and overlapping manner, causes the processor to perform operations comprising: detect a fault associated with the first display screen; select one of the display screens other than the first display screen as a backup display screen; combine a first image generated for displaying on the first display screen and a second image generated for displaying on the selected display screen to form a combined image; and display the combined image on the selected display screen.

In the above paragraph, selecting one of the display screens may include: detecting an undamaged display screen from among the plurality of display screens; if the detecting successfully detects an undamaged display screen, assign the detected undamaged screen as the selected backup display screen; and if the detecting fails to detect an undamaged display screen, determine a least damaged display screen among the plurality of display screens, and assign the determined least damaged display screen as the selected backup display screen.

Embodiments according to the present disclosure are thus described. While the present disclosure has been described in particular embodiments, it should be appreciated that the disclosure should not be construed as limited by such embodiments.

The invention claimed is:

1. A multi-layered display (MLD) system for displaying three-dimensional images, comprising:
   a plurality of display screens including at least a first display screen and a second display screen arranged in a substantially parallel and overlapping manner; and
   a processing system comprising at least one processor and memory, the processing system configured to:
   detect a fault associated with the first display screen;
   select one of the display screens other than the first display screen as a backup display screen;
   combine a first image generated for displaying on the first display screen and a second image generated for displaying on the selected backup display screen to form a combined image;
   display the combined image on the selected backup display screen;
   identify one or more prioritized objects in the first image; and display the identified one or more prioritized objects in a manner different from the display of the combined image.

2. The multi-layered display system according to claim 1, wherein selecting one of the display screens comprises:
  detecting an undamaged display screen from among the plurality of display screens;
  if the detecting successfully detects an undamaged display screen, assign the detected undamaged screen as the selected backup display screen; and
  if the detecting fails to detect an undamaged display screen, determine a least damaged display screen among the plurality of display screens, and assign the determined least damaged display screen as the selected backup display screen.

3. The multi-layered display system according to claim 1, wherein said combining comprises calculating the combined image based upon an arithmetic sum of the first image and the second image.

4. The multi-layered display system according to claim 1, wherein the displaying the identified one or more prioritized objects comprises:
  determining whether at least a portion of the first display screen is operational;
  generating a third image comprising the identified one or more prioritized objects; and
  if the determining determines that a portion of the first display is operational, displaying the third image on the first display screen.

5. The multi-layered display system according to claim 4, wherein the third image is rerouted to a working portion, which is different from a portion of the first display screen in which the prioritized objects were originally displayed, of the first display screen.

6. The multi-layered display system according to claim 1, wherein the multi-layered display system displays a vehicle dashboard display, and wherein the one or more prioritized objects include a warning light and/or transmission indicator.

7. The multi-layered display system according to claim 1, wherein the processing system is further configured to set the first display screen at least partially off.

8. The multi-layered display system according to claim 1, wherein at least one of display screen of the plurality of display screens is a liquid crystal display.

9. The multi-layered display system according to claim 1, wherein the plurality of display screens is stacked in normally black mode.

10. The multi-layered display system according to claim 9, wherein a rear-most display screen of the plurality of display screens is a non-transparent display screen.

11. The multi-layered display system according to claim 1, wherein the plurality of display screens comprises a stack of liquid crystal display (LCD) layers within a single pair of cross-polarizers on external facing surfaces.

12. The multi-layered display system according to claim 1, wherein the plurality of display screens comprises a stack of transparent light emitting diode (TLED) or organic light emitting diode (OLED) layers.

13. The multi-layered display system according to claim 1, wherein the plurality of display screens comprises at least one non-transparent display screen.

14. The multi-layered display system according to claim 1, wherein the fault is due to a crack in the first display screen, one or more non-functioning rows or columns in the first display screen, a region of dead pixels in the first display screen, and/or dead first display screen.

15. A method for displaying three-dimensional images in a multi-layered display (MLD) system comprising a plurality of display screens including at least a first display screen and a second display screen arranged in a substantially parallel and overlapping manner, the method comprising:
  detecting, using a processing system comprising at least one processor and memory, a fault associated with the first display screen;
  selecting one of the display screens other than the first display screen as a backup display screen;
  combining a first image generated for displaying on the first display screen and a second image generated for displaying on the selected backup display screen to form a combined image;
  displaying the combined image on the selected backup display screen;
  identifying one or more prioritized objects in the first image; and
  displaying the identified one or more prioritized objects in a manner different from the displaying of the combined image.

16. The method according to claim 15, wherein selecting one of the display screens comprises:
  detecting an undamaged display screen from among the plurality of display screens;
  if the detecting successfully detects an undamaged display screen, assign the detected undamaged screen as the selected backup display screen; and
  if the detecting fails to detect an undamaged display screen, determine a least damaged display screen among the plurality of display screens, and assign the determined least damaged display screen as the selected backup display screen.

17. The method according to claim 15, wherein said combining comprises calculating the combined image based upon an arithmetic sum of the first image and the second image.

18. A non-transitory computer readable storage medium storing instructions which, when executed by a processor of a multi-layered display (MLD) system having a plurality of display screens including at least first and second display screens arranged in a substantially parallel and overlapping manner, causes the processor to perform operations comprising:
  detect a fault associated with the first display screen;
  select one of the display screens other than the first display screen as a backup display screen;
  combine a first image generated for displaying on the first display screen and a second image generated for displaying on the selected display screen to form a combined image;
  display the combined image on the selected display screen;
  identify one or more prioritized objects in the first image; and
  display the identified one or more prioritized objects in a manner different from the display of the combined image.

19. The non-transitory computer readable storage medium according to claim 18, wherein selecting one of the display screens comprises:
  detecting an undamaged display screen from among the plurality of display screens;
  if the detecting successfully detects an undamaged display screen, assign the detected undamaged screen as the selected backup display screen; and if the detecting fails to detect an undamaged display screen, determine a least damaged display screen among the plurality of display screens, and assign the determined least damaged display screen as the selected backup display screen.

\* \* \* \* \*